United States Patent
Kumar et al.

(10) Patent No.: US 10,608,931 B1
(45) Date of Patent: Mar. 31, 2020

(54) SELECTIVE MULTICASTING OF TRAFFIC FLOWS IN MULTIPROTOCOL LABEL SWITCHING VIRTUAL PRIVATE NETWORKS

(71) Applicant: Juniper Networks, Inc., Sunnyvale, CA (US)

(72) Inventors: Vinod N. Kumar, Bangalore (IN); Sunil Kumar, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 279 days.

(21) Appl. No.: 15/362,193

(22) Filed: Nov. 28, 2016

(51) Int. Cl.
  G06F 15/173 (2006.01)
  H04L 12/723 (2013.01)
  H04L 12/46 (2006.01)
  H04L 12/18 (2006.01)
  H04L 12/761 (2013.01)

(52) U.S. Cl.
  CPC .............. H04L 45/50 (2013.01); H04L 12/18 (2013.01); H04L 12/4633 (2013.01); H04L 12/4641 (2013.01); H04L 45/16 (2013.01)

(58) Field of Classification Search
  CPC . H04L 12/4641; H04L 12/4633; H04L 12/18; H04L 45/16; H04L 45/50
  See application file for complete search history.

(56) References Cited

U.S. PATENT DOCUMENTS

| | | | | |
|---|---|---|---|---|
| 6,853,639 B1 * | 2/2005 | Watanuki | ............. | H04L 12/185 370/390 |
| 2007/0274235 A1 * | 11/2007 | Boers | ..................... | H04L 12/66 370/256 |
| 2011/0051651 A1 * | 3/2011 | Wu | ........................ | H04L 12/185 370/312 |
| 2014/0003246 A1 * | 1/2014 | Han | ....................... | H04L 12/185 370/236 |
| 2014/0016457 A1 * | 1/2014 | Enyedi | .................... | H04L 45/16 370/225 |
| 2015/0092569 A1 * | 4/2015 | Venkataraman | ....... | H04L 47/125 370/248 |
| 2016/0043876 A1 * | 2/2016 | Kotalwar | ................ | H04L 12/18 370/235 |
| 2017/0289217 A1 * | 10/2017 | Kebler | ................... | H04L 45/02 |

OTHER PUBLICATIONS

E. Rosen et al., "Cisco Systems' Solution for Mulitcast in BGP/MPLS IP VPNs," https://tools.ietf.org/html/rfc6037, Oct. 2010, 26 pages.

* cited by examiner

*Primary Examiner* — Padma Mundur
(74) *Attorney, Agent, or Firm* — Harrity & Harrity, LLP

(57) ABSTRACT

A first device may receive a traffic flow to be multicasted to at least two of a set of second devices. The first device may provide first messages to the set of second devices identifying the traffic flow. The first device may identify a set of interested second devices, of the set of second devices, based on respective second messages that are received from the set of interested second devices based on the first messages. The first device may determine whether a quantity of the set of interested second devices satisfies a threshold. The first device may selectively provide the traffic flow to the set of interested second devices, using a first type of multicast distribution tree or a second type of multicast distribution tree, based on whether the quantity satisfies the threshold.

20 Claims, 10 Drawing Sheets

```
 +-+-+-+-+-+-+-+-+-+-+-+-+-+-+-+-+-+-+-+-+-+-+-+-+-+-+-+-+-+-+-+-+
 |     Type      |   Reserved    |            Length             |
 +-+-+-+-+-+-+-+-+-+-+-+-+-+-+-+-+-+-+-+-+-+-+-+-+-+-+-+-+-+-+-+-+
 |                            C-source                           |
 +-+-+-+-+-+-+-+-+-+-+-+-+-+-+-+-+-+-+-+-+-+-+-+-+-+-+-+-+-+-+-+-+
 |                            C-group                            |
 +-+-+-+-+-+-+-+-+-+-+-+-+-+-+-+-+-+-+-+-+-+-+-+-+-+-+-+-+-+-+-+-+
 |                            P-group                            |
 +-+-+-+-+-+-+-+-+-+-+-+-+-+-+-+-+-+-+-+-+-+-+-+-+-+-+-+-+-+-+-+-+
```

SELECTIVE MULTICASTING OF TRAFFIC FLOWS IN MULTIPROTOCOL LABEL SWITCHING VIRTUAL PRIVATE NETWORKS

BACKGROUND

Multiprotocol Label Switching (MPLS) virtual private networking (VPN) (MPLS VPN) is a family of methods for using MPLS to create VPNs. MPLS VPN is a flexible method to transport and route several types of network traffic using an MPLS backbone. MPLS is a type of data-carrying technique that directs data from one node to the next based on path labels rather than network addresses, thus avoiding lookups in a routing table. When multicasting a data stream in an MPLS VPN from one node (e.g., a root node or an ingress provider edge device) to multiple nodes (e.g., leaf nodes or egress provider edge devices), a multicast VPN (MVPN) approach may be used, because MPLS VPN may not natively support multicasting of traffic flows.

SUMMARY

According to some possible implementations, a first device may include one or more processors. The one or more processors may receive a traffic flow to be multicasted to at least two of a set of second devices. The one or more processors may provide first messages to the set of second devices identifying the traffic flow. The one or more processors may identify a set of interested second devices, of the set of second devices, based on respective second messages that are received from the set of interested second devices based on the first messages. The one or more processors may determine whether a quantity of the set of interested second devices satisfies a threshold. The one or more processors may selectively provide the traffic flow to the set of interested second devices, using a first type of multicast distribution tree or a second type of multicast distribution tree, based on whether the quantity satisfies the threshold. The first device may use the first type of multicast distribution tree when the quantity satisfies the threshold. The first device may use the second type of multicast distribution tree when the quantity does not satisfy the threshold.

According to some possible implementations, a non-transitory computer-readable medium may store one or more instructions that, when executed by one or more processors of a first network node, may cause the one or more processors to receive a traffic flow to be multicasted to at least two of a set of second network nodes. The one or more instructions, when executed by one or more processors of the first network node, may cause the one or more processors to provide probe messages identifying the traffic flow to the set of second network nodes. The probe messages may be provided using a default multicast distribution tree (MDT). The one or more instructions, when executed by one or more processors of the first network node, may cause the one or more processors to identify a set of interested network nodes, of the set of second network nodes, based on respective acknowledgement messages that are received from the set of interested network nodes based on the probe messages. The one or more instructions, when executed by one or more processors of the first network node, may cause the one or more processors to determine whether a quantity of the set of interested network nodes satisfies a threshold. The one or more instructions, when executed by one or more processors of the first network node, may cause the one or more processors to selectively provide, to the set of interested network nodes, the traffic flow using the default MDT or a data MDT based on whether the quantity satisfies the threshold. The first network node may use the default MDT when the quantity satisfies the threshold. The first network node may use the data MDT when the quantity does not satisfy the threshold.

According to some possible implementations, a method may include receiving, by a first network node, a traffic flow to be multicasted to at least two of a set of second network nodes. The method may include providing, by the first network node, probe messages identifying the traffic flow to the set of second network nodes. The method may include identifying, by the first network node, a set of interested network nodes, of the set of second network nodes, based on respective acknowledgement messages that are received from the set of interested network nodes based on the probe messages. The method may include determining, by the first network node, whether a quantity of the set of interested network nodes satisfies a threshold. The method may include selectively providing, by the first network node, the traffic flow, using a first type of multicast distribution tree or a second type of multicast distribution tree, based on whether the quantity satisfies the threshold. The first network node may use the first type of multicast distribution tree when the quantity satisfies the threshold. The first network node may use the second type of multicast distribution tree when the quantity does not satisfy the threshold.

BRIEF DESCRIPTION OF THE DRAWINGS

FIG. 5 is a diagram of an example probe message;

DETAILED DESCRIPTION

Figure 1A:
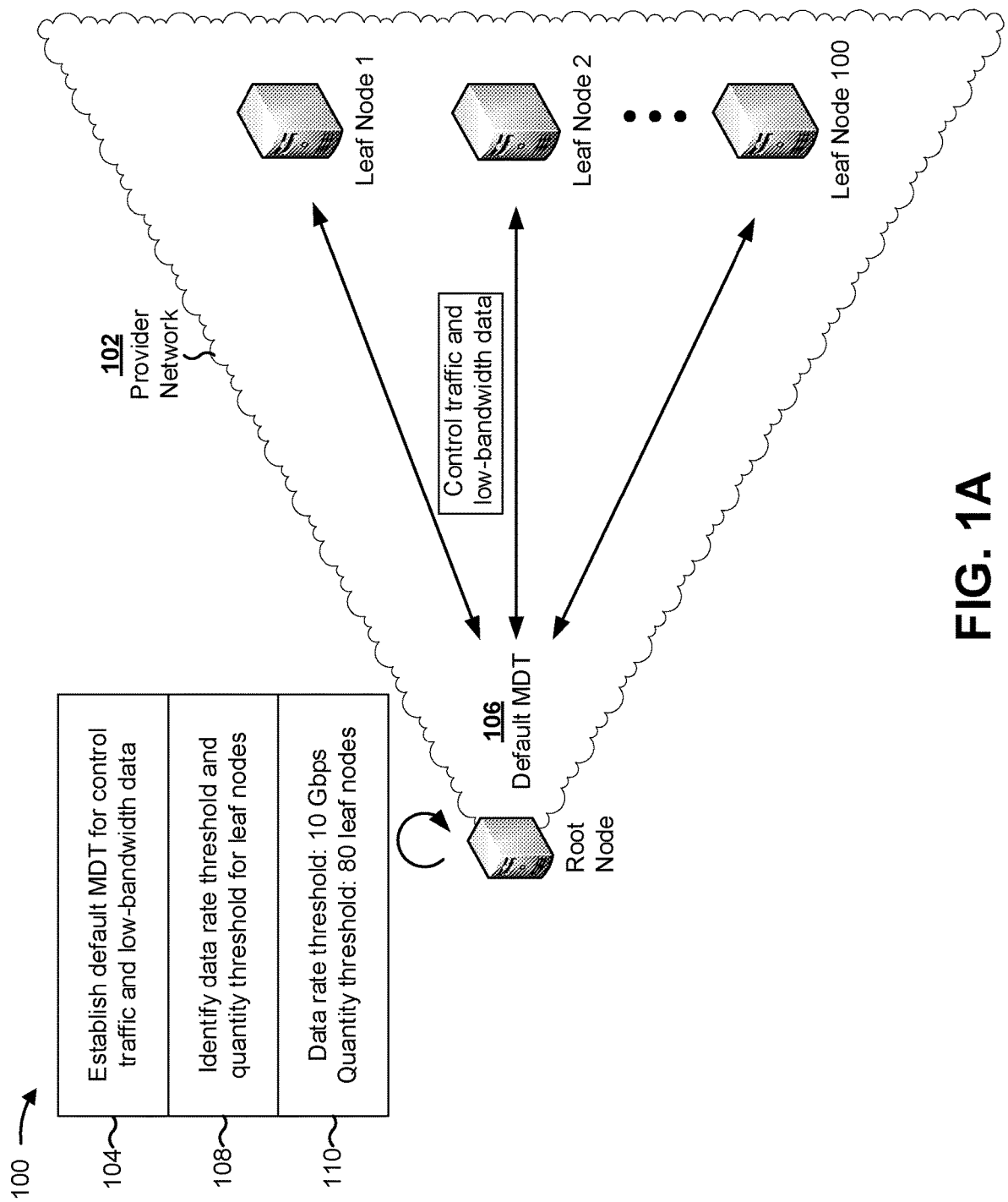
FIGS. 1A-1D are diagrams of an overview of an example implementation described herein.

The following detailed description of example implementations refers to the accompanying drawings. The same reference numbers in different drawings may identify the same or similar elements.

A network provider may multicast network traffic from a root node (e.g., an ingress edge node of a provider network) to a set of leaf nodes (e.g., a set of egress edge nodes associated with recipient customer devices of a customer network). For example, the root node and the set of leaf nodes may be included in an MPLS VPN of a provider network, and the network traffic may be multicasted using an MVPN approach, such as a Rosen-MVPN approach. In some implementations, the MVPN approach may use one of two approaches to multicast the traffic to the leaf nodes: a default multicast distribution tree (MDT) or a data MDT.

A default MDT identifies each egress provider edge device (e.g., each leaf node) connected to a VPN or group. Data that is multicasted via the default MDT is multicasted to every leaf node of the VPN or group. The default MDT may be used for low-bandwidth data multicasting and control messaging of the leaf nodes, and may be associated with a lower network overhead than the data MDT.

A data MDT identifies a particular set of leaf nodes, selected from all leaf nodes associated with the VPN or group. The data MDT multicasts the traffic to the particular set of leaf nodes without multicasting the traffic to the other leaf nodes. A set of leaf nodes that are interested in receiving the traffic may be referred to herein as "interested leaf nodes" or "interested network nodes," and other leaf nodes may be referred to herein as "uninterested leaf nodes." A leaf node may be identified as an interested leaf node based on the leaf node being associated with a customer device or a customer network that is to receive the network traffic.

When multicasting network traffic, using a default MDT may consume significant bandwidth resources. For example, when not many leaf nodes are interested in receiving the network traffic, it may be wasteful to multicast the network traffic to both interested and uninterested leaf nodes using the default MDT. Conversely, when multicasting network traffic, using a data MDT may use more resources of the root node and the interested leaf nodes than using a default MDT (e.g., based on messaging to establish the data MDT, network overhead to maintain the data MDT, etc.). In some cases, it may be more efficient to multicast the network traffic using a default MDT, rather than a data MDT (e.g., when the number of interested leaf nodes approaches the number of total leaf nodes, or when the total data rate is low).

Implementations described herein track a quantity of leaf nodes that are interested in receiving a multicast traffic flow, and selectively provide the multicast traffic flow using a default MDT or a data MDT based on the quantity of interested leaf nodes and/or based on a data rate of the multicast traffic flow. For example, a root node may track the quantity of interested leaf nodes based on acknowledgements of a probe message sent from the root node to all leaf nodes. In some implementations, a root node may identify leaf nodes that are no longer interested in receiving the multicast traffic flow based on receiving prune messages from the leaf nodes. The root node may dynamically switch between a default MDT and a data MDT as a number of interested leaf nodes increases or decreases (e.g., based on a threshold quantity of interested leaf nodes). In this way, in a situation where a data MDT is used, the root node conserves network bandwidth resources that would otherwise be used to multicast the network traffic to each leaf node of the network. Further, in a situation where a default MDT is used, the root node conserves processor and/or storage resources of leaf nodes that would otherwise be used to establish and maintain a resource-costly data MDT.

FIGS. 1A-1D are diagrams of an overview of an example implementation 100 described herein. Example implementation 100 includes provider network 102, which includes a root node and a set of leaf nodes 1 through 100. Example implementation 100 also includes a customer device, which may be associated with a customer network, and which may provide a traffic flow to be multicasted to the set of leaf nodes 1 through 100. In some implementations, interested leaf nodes, of the set of leaf nodes 1 through 100, may provide the traffic flow to respective customer networks associated with the interested leaf nodes.

As shown in FIG. 1A, and by reference number 104, the root node may establish a default MDT via which to provide control traffic and low-bandwidth data to the set of leaf nodes. As shown by reference number 106, the root node exchanges control traffic and low-bandwidth data with the set of leaf nodes 1 through 100 via the default MDT. For example, the root node may broadcast the control traffic and low-bandwidth data to each leaf node 1 through 100 via the default MDT.

As shown by reference number 108, the root node identifies a data rate threshold and a quantity threshold. For example, the root node may be configured with the data rate threshold and/or the quantity threshold. Additionally, or alternatively, the root node may determine the data rate threshold and/or the quantity threshold (e.g., based on characteristics of provider network 102).

The data rate threshold may identify a data rate, and the quantity threshold may identify a quantity of interested leaf nodes. When an observed data rate of the traffic flow satisfies the data rate threshold and an observed leaf node count does not satisfy the quantity threshold, the root node establishes a data MDT with interested leaf nodes. Establishing a data MDT in the case of a high data rate (e.g., a data rate that satisfies the data rate threshold) and a low quantity of interested leaf nodes (e.g., a quantity of interested leaf nodes that does not satisfy the data rate threshold) may be more bandwidth-efficient than multicasting the traffic flow to all leaf nodes irrespective of whether the leaf nodes are interested in receiving the traffic flow.

When the observed data rate does not satisfy the data rate threshold, or when the quantity of interested leaf nodes satisfies the quantity threshold, the root node may use a default MDT to provide the multicast traffic flow. Using a default MDT to provide low-bandwidth data to a large quantity of interested leaf nodes may conserve processor and/or network resources of root node 220, leaf nodes 230-1 through 230-N, and some intermediate nodes of network 240, as compared to establishing and maintaining a data MDT with the large quantity of interested leaf nodes to provide the low-bandwidth data. As shown by reference number 110, the root node determines a data rate threshold of 10 gigabits per second (Gbps), and a quantity threshold of 80 leaf nodes.

Figure 1B:
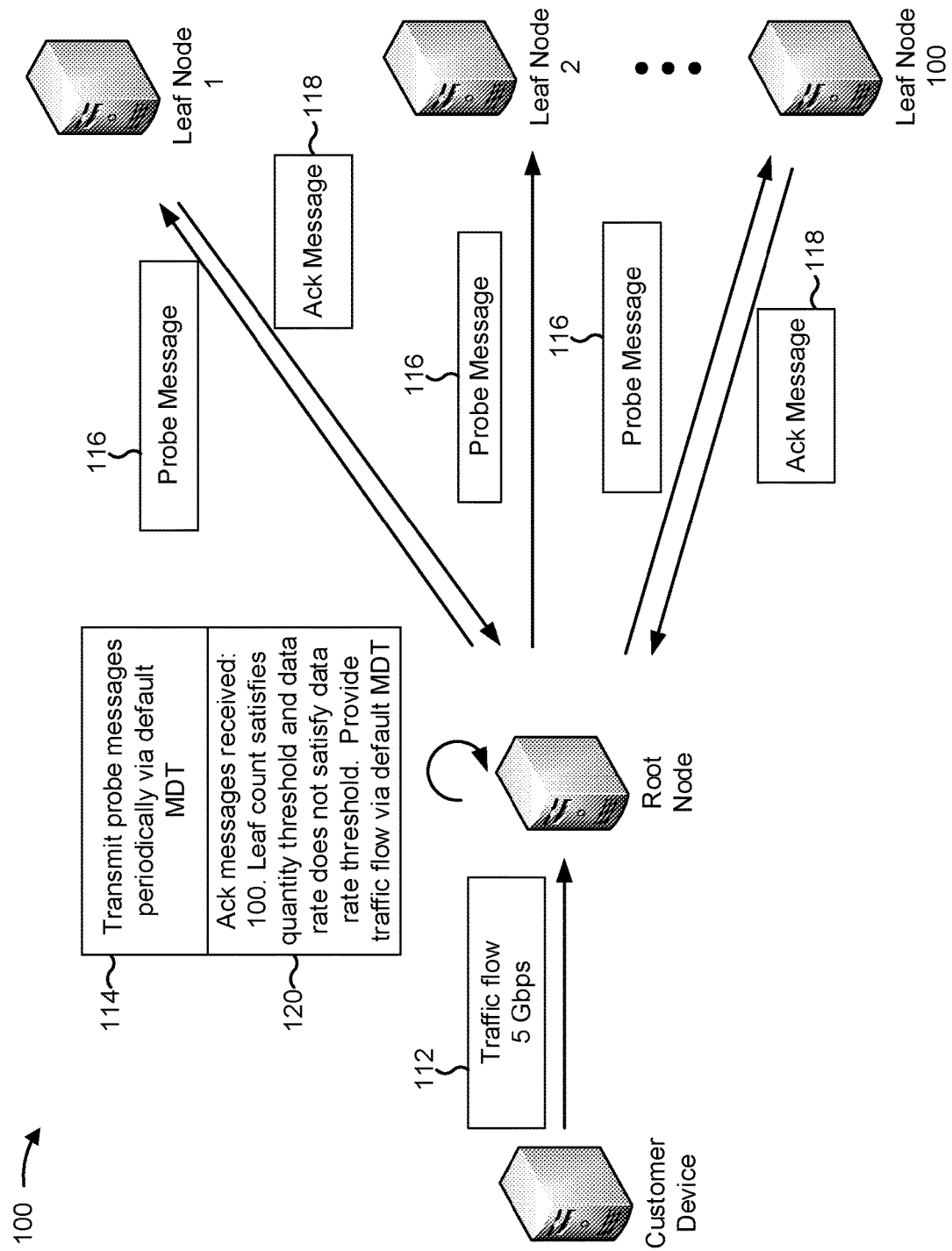

As shown in FIG. 1B, and by reference number 112, the customer device provides a traffic flow, with a data rate of 5 Gbps, to the root node. In some implementations, the data rate may identify a per-node data rate (e.g., a data rate of 20 Gbps to each leaf node of provider network 102). In some implementations, the data rate may identify a cumulative data rate. For example, if ten root nodes each receives a traffic flow of 20 Gbps, the cumulative data rate may be 200 Gbps.

As shown by reference number 114 the root node may transmit one or more probe messages periodically via the default MDT. The root node may provide probe messages to identify leaf nodes that are interested in receiving the traffic flow. As shown by reference number 116, the root node may transmit a probe message to each leaf node 1 through 100 of provider network 102 via the default MDT. In some implementations, the probe message may identify the traffic flow, the root node, and/or the originating customer device, as described in more detail elsewhere herein.

As shown by reference number 118, one or more leaf nodes may provide acknowledgement messages (e.g., shown as "Ack Messages") based on receiving the probe messages. In some implementations, an acknowledgement message may indicate that a leaf node is interested in receiving a traffic flow associated with a corresponding probe message. In some implementations, an acknowledgement message may identify the traffic flow and a leaf node that transmitted the acknowledgement message, as described in more detail elsewhere herein.

As shown by reference number 120, the root node may receive 100 acknowledgement messages (e.g., one from each leaf node 1 through 100 included in provider network 102). The root node determines that the leaf node count satisfies the quantity threshold of 80 leaf nodes, and that the data rate does not satisfy the data rate threshold of 10 Gbps. Thus, the root node provides the traffic flow via the default MDT. In this way, resources of the root node and the leaf nodes 1 through 100 are conserved that would otherwise be used to establish and maintain a data MDT.

Figure 1C:
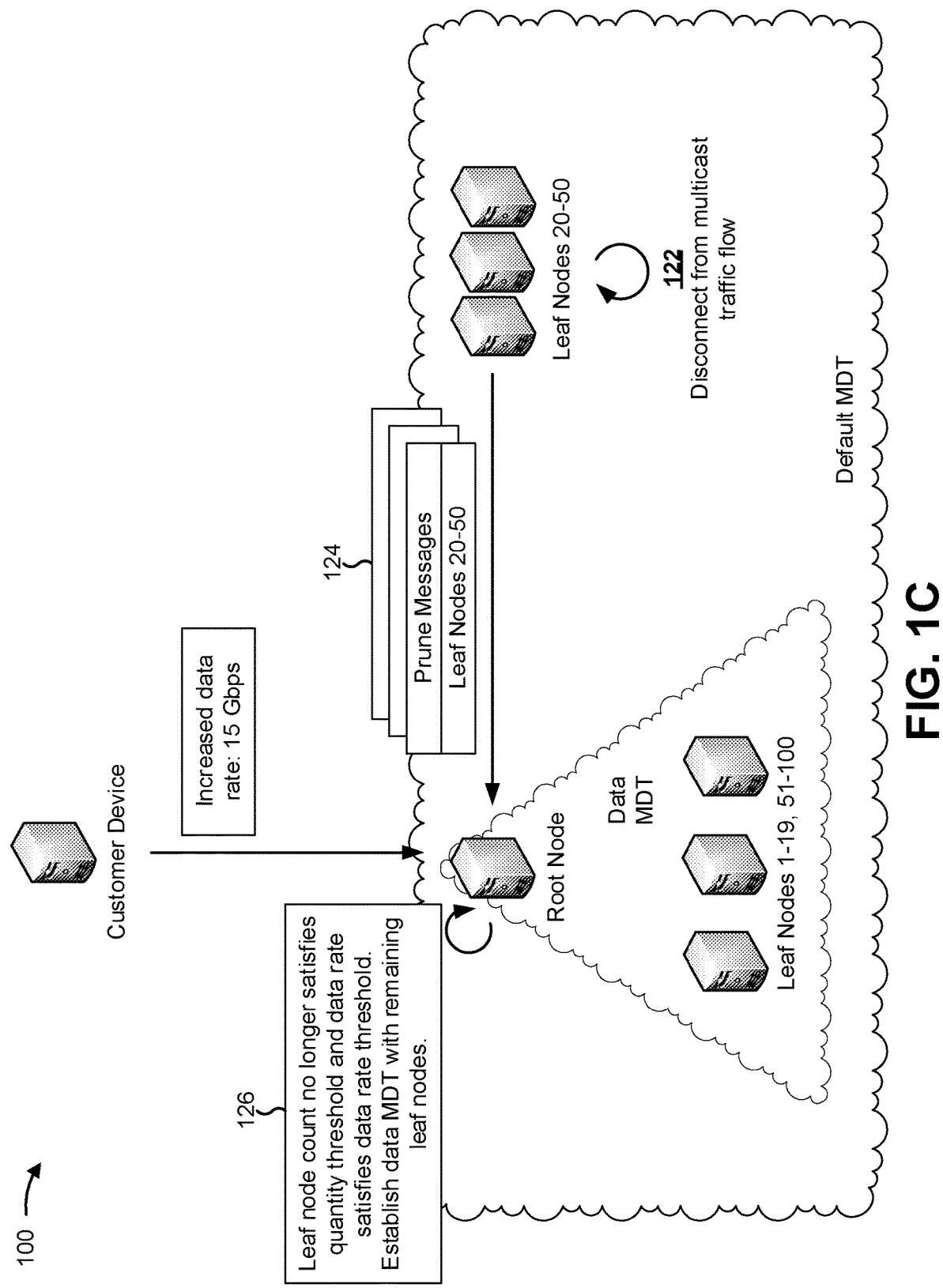

For the purpose of FIG. 1C, and as shown, assume that the data rate increases to 15 Gbps (e.g., a value that satisfies the data rate threshold). As shown in FIG. 1C, and by reference number 122, a set of leaf nodes 20 through 50 determine not to receive the multicast traffic flow (e.g., and disconnect from multicast traffic flow). As shown by reference number 124, to disconnect from multicast traffic flow, leaf nodes 20 through 50 provide respective prune messages to the root node. A prune message may identify the multicast traffic flow, and may identify a leaf node that transmitted the prune message. In some implementations, a prune message may contain similar information to an acknowledgement message, and a bit value may differentiate the acknowledgement message from the prune message (e.g., a bit value of 1 may identify a message as an acknowledgement message, and a bit value of 0 may identify a message as a prune message).

As shown by reference number 126, the root node determines that the leaf node count no longer satisfies the leaf count threshold, and that the data rate satisfies the data rate threshold. Based on the leaf node count no longer satisfying the leaf count threshold and/or the data rate satisfying the data rate threshold, the root node may establish a data MDT with a remainder of the interested leaf nodes (e.g., leaf nodes 1 through 19 and leaf nodes 51 through 100). In this way, network resources are conserved that would otherwise be used to multicast the traffic flow to the uninterested leaf nodes 20 through 50.

Figure 1D:
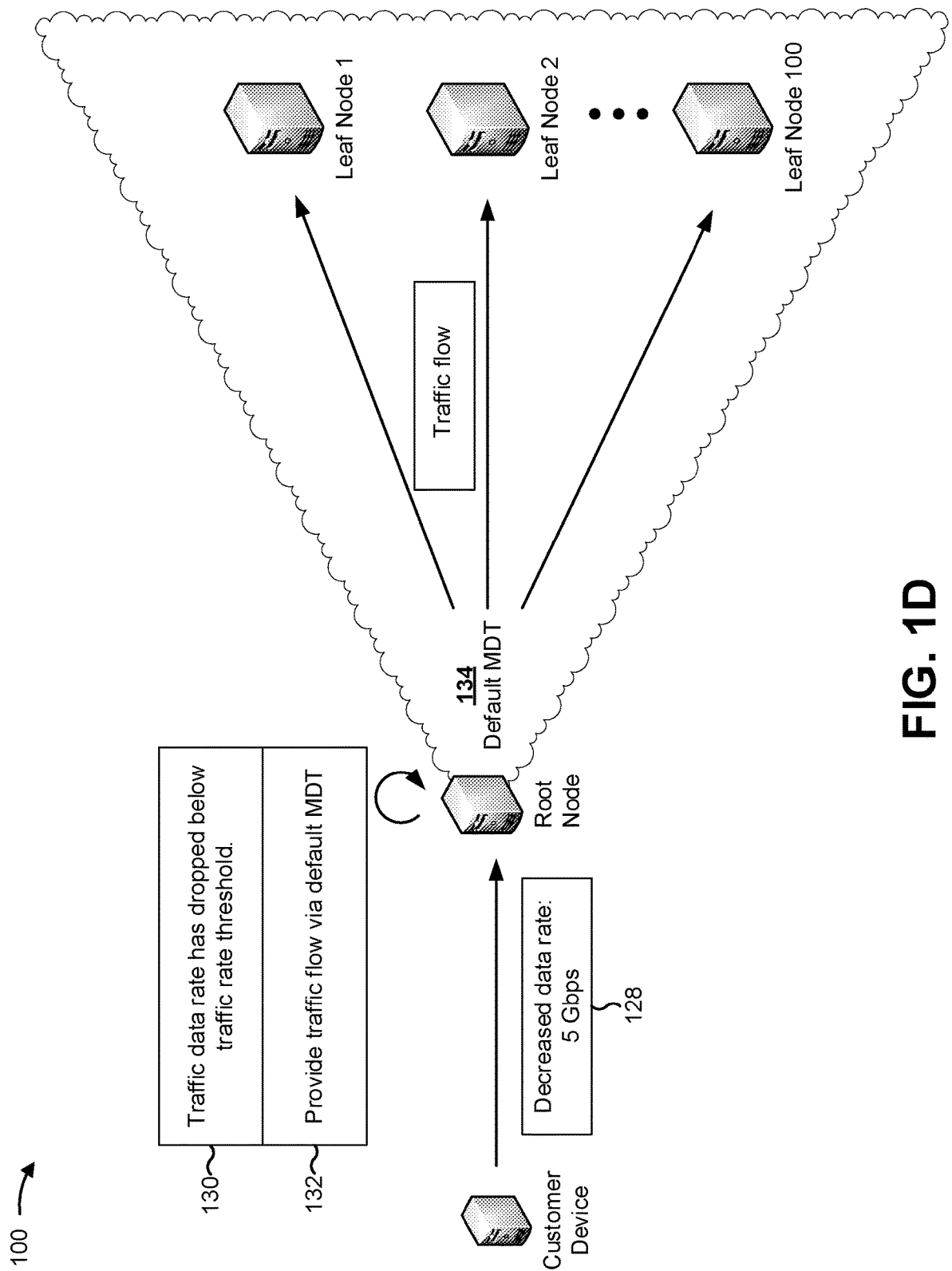

For the purpose of FIG. 1D, assume that the traffic flow data rate decreases again to 5 Gbps. As shown in FIG. 1D, and by reference number 128, the customer device may provide the decreased data rate of 5 Gbps to the root node (e.g., decreased from 15 Gbps, as described in connection with FIG. 1C). As shown by reference number 130, the root node determines that the data rate has decreased and no longer satisfies the data rate threshold. As shown by reference number 132, based on the data rate not satisfying the data rate threshold, the root node determines to provide the multicast traffic flow via a default MDT. As shown by reference number 134, the root node provides the multicast traffic flow to the leaf nodes 1 through 100 via the default MDT. The uninterested leaf nodes 20 through 50 may drop the traffic flow.

In this way, in a situation where the data MDT is used, the root node conserves provider network 102 bandwidth resources that would otherwise be used to multicast the multicast flow traffic to each of the leaf nodes 1 through 100. Additionally, or alternatively, in a situation where the default MDT is used, the root node conserves processor and/or storage resources of leaf nodes 1 through 100 that would otherwise be used to establish and maintain a resource-costly data MDT.

As indicated above, FIGS. 1A-1D are provided merely as an example. Other examples are possible and may differ from what was described with regard to FIGS. 1A-1D.

Figure 2:
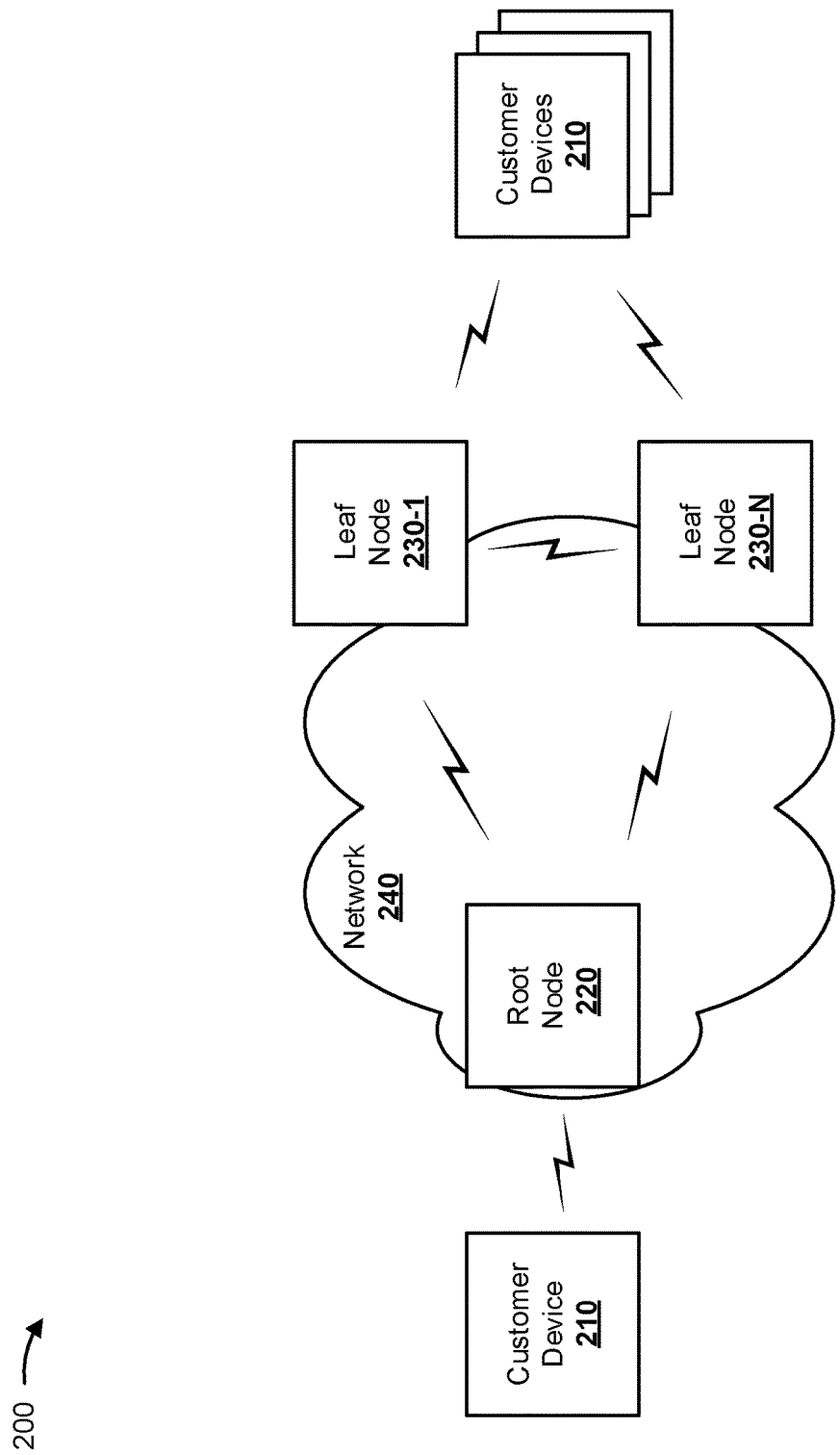
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a set of customer devices 210, a root node 220, a set of leaf nodes 230-1 through 230-N (N≥1) (hereinafter referred to collectively as "leaf nodes 230," and individually as "leaf node 230"), and a network 240. Devices of environment 200 may interconnect via wired connections, wireless connections, or a combination of wired and wireless connections.

Customer device 210 includes one or more devices (e.g., one or more traffic transfer devices) capable of processing and/or transferring traffic. For example, customer device 210 may include a customer edge device, a firewall, a router, a gateway, a switch, a hub, a bridge, a reverse proxy, a server (e.g., a proxy server), a security device, an intrusion detection device, a load balancer, or a similar type of device. In some implementations, customer device 210 may transmit traffic to root node 220, as described elsewhere herein. Additionally, or alternatively, customer device 210 may receive traffic from leaf node 230, as described elsewhere herein.

Root node 220 includes one or more devices (e.g., one or more traffic transfer devices) capable of processing and/or transferring traffic (e.g., a multicasted data flow) between endpoint devices. For example, root node 220 may include a provider edge device, a firewall, a router, a gateway, a switch, a hub, a bridge, a reverse proxy, a server (e.g., a proxy server), a security device, an intrusion detection device, a load balancer, a network node, or a similar type of device. In some implementations, root node 220 may receive traffic from customer device 210 and may provide the traffic to a set of leaf nodes 230, as described elsewhere herein. In some implementations, root node 220 may be associated with network 240.

Leaf node 230 includes one or more devices (e.g., one or more traffic transfer devices) capable of processing and/or transferring traffic (e.g., a multicasted data flow) between customer devices 210. For example, leaf node 230 may include a provider edge device, a firewall, a router, a gateway, a switch, a hub, a bridge, a reverse proxy, a server (e.g., a proxy server), a security device, an intrusion detection device, a load balancer, a network node, or a similar type of device. In some implementations, leaf node 230 may receive traffic (e.g., a multicasted traffic flow) from root node 220 and may provide the traffic to a customer device 210 associated with leaf node 230, as described elsewhere herein. In some implementations, leaf node 230 may be associated with network 240.

Network 240 includes one or more wired and/or wireless networks. For example, network 240 may include a multi-protocol label switching (MPLS) network, a cellular network (e.g., a long-term evolution (LTE) network, a 3G network, or a code division multiple access (CDMA) network), a public land mobile network (PLMN), a local area network (LAN), a wide area network (WAN), a metropolitan area network (MAN), a telephone network (e.g., the Public Switched Telephone Network (PSTN)), an EVPN network, a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
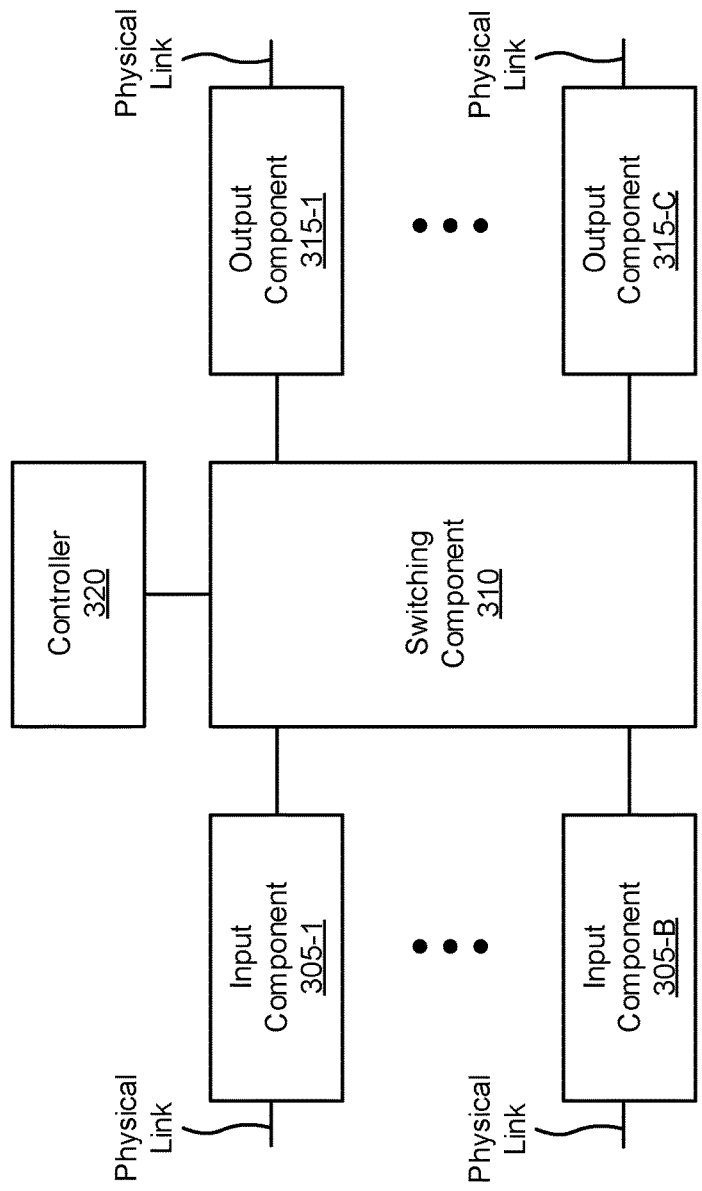
FIG. 3 is a diagram of example components of one or more devices of FIG. 2.

FIG. 3 is a diagram of example components of a device 300. Device 300 may correspond to customer device 210, root node 220, and leaf node 230. In some implementations, customer device 210, root node 220, and leaf node 230 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor implemented in hardware, firmware, or a combination of hardware and software. A processor includes a central processing unit (CPU), a graphics processing unit (GPU), an accelerated processing unit (APU), a microprocessor, a microcontroller, a digital signal processor, a field-programmable gate array (FPGA), an application-specific integrated circuit (ASIC), or another type of processing component. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
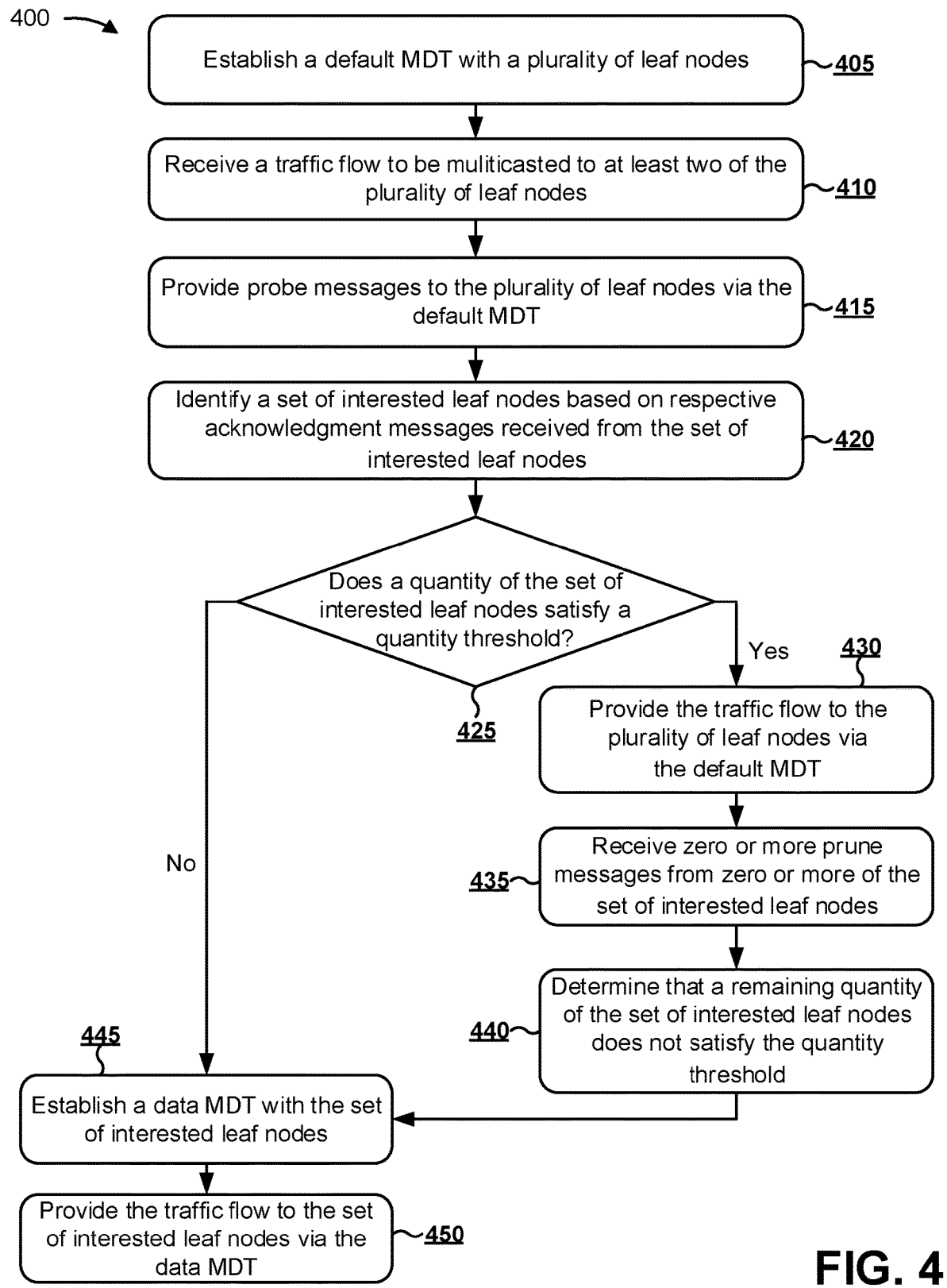
FIG. 4 is a flow chart of an example process for providing a multicast data flow to a set of leaf nodes.

FIG. 4 is a flow chart of an example process 400 for providing a multicast data flow to a set of leaf nodes. In some implementations, one or more process blocks of FIG. 4 may be performed by root node 220. In some implementations, one or more process blocks of FIG. 4 may be performed by another device or a group of devices separate from or including root node 220, such as customer device 210 and leaf node 230.

As shown in FIG. 4, process 400 may include establishing a default MDT with a plurality of leaf nodes (block 405). For example, root node 220 may establish a default MDT with a plurality of leaf nodes 230. In some implementations, a default MDT may be an MDT that is used for low-bandwidth traffic (e.g., below a data rate threshold) and/or control traffic. An MDT may be used for a multicast tunnel that transports customer multicast traffic from root node 220 (e.g., an ingress provider edge device) to one or more leaf nodes 230 (e.g., one or more egress provider edge devices). In some implementations, such as a ROSEN MVPN deployment, the network traffic may be carried using a Protocol Independent Multicast-Generic Route Encapsulation (PIM-GRE) tunnel.

In some implementations, data sent via the default MDT is broadcasted to every provider edge device associated with network 240 (e.g., every root node 220 and leaf node 230 associated with a particular MVPN or multicast virtual route forwarding (MVRF) implementation). In some implementations, root node 220 may establish the default MDT as part of a setup or onboarding process of an MVPN or multicast virtual routing and forwarding (MVRF). For example, root node 220 may send a message to the plurality of leaf nodes 230, and may receive acknowledgements, such as customer Protocol Independent Multicast (C-PIM) messages, from the plurality of leaf nodes 230 based on the message. Additionally, or alternatively, the plurality of leaf nodes 230 may transmit advertisements (e.g., periodically), and root node 220 may establish a default MDT with the plurality of leaf nodes 230 based on the advertisements.

As further shown in FIG. 4, process 400 may include receiving a traffic flow to be multicasted to at least two of the plurality of leaf nodes (block 410). For example, root node 220 may receive a traffic flow to be multicasted from customer device 210. In some implementations, the traffic flow may be a data flow, such as streaming video content, streaming audio content, streaming multimedia content, streaming data, or the like. In some implementations, the traffic flow received by root node 220 may be multicasted to the plurality of leaf nodes 230 or to a set of interested leaf nodes 230 of the plurality of leaf nodes 230. For example, when the traffic flow is provided via a default MDT, the traffic flow may be multicasted to the plurality of leaf nodes 230, irrespective of status as an interested leaf node 230 or an uninterested leaf node 230. When the traffic flow is provided via a data MDT, root node 220 may provide the traffic flow to the set of interested leaf nodes 230 and not to the set of uninterested leaf nodes 230.

As further shown in FIG. 4, process 400 may include providing probe messages to the plurality of leaf nodes via the default MDT (block 415). For example, root node 220 may provide a probe message to a plurality of leaf nodes 230 via the default MDT. In some implementations, root node 220 may provide the probe message automatically. For example, root node 220 may provide the probe message periodically. In this way, root node 220 saves processor resources that would be used to identify conditions for sending probe messages. Additionally, or alternatively, root node 220 may provide the probe message as part of a setup process for the default MDT. Additionally, or alternatively, root node 220 may provide the probe message based on the traffic flow satisfying a data rate threshold. In this way, root node 220 saves network resources and time during the setup of the default MDT.

In some implementations, the probe message may be defined based on a type-length-value element of a specification, such as RFC 6037. For example, the probe message may identify a message type (e.g., a byte value of 2 that identifies the message as a probe message). Additionally, or alternatively, the probe message may identify a length (e.g., one or more bytes that identify a length of the message, such as 16 bytes, 32 bytes, etc.). Additionally, or alternatively, the probe message may identify a customer multicast source network address (e.g., C-source) (e.g., IPv4 address or IPv6 address). Additionally, or alternatively, the probe message may identify a customer multicast group network address (e.g., C-group) (e.g., IPv4 address or IPv6 address). Additionally, or alternatively, the probe message may identify a multicast group address that root node 220 may use to send data MDT traffic (e.g., P-group).

Figure 5:
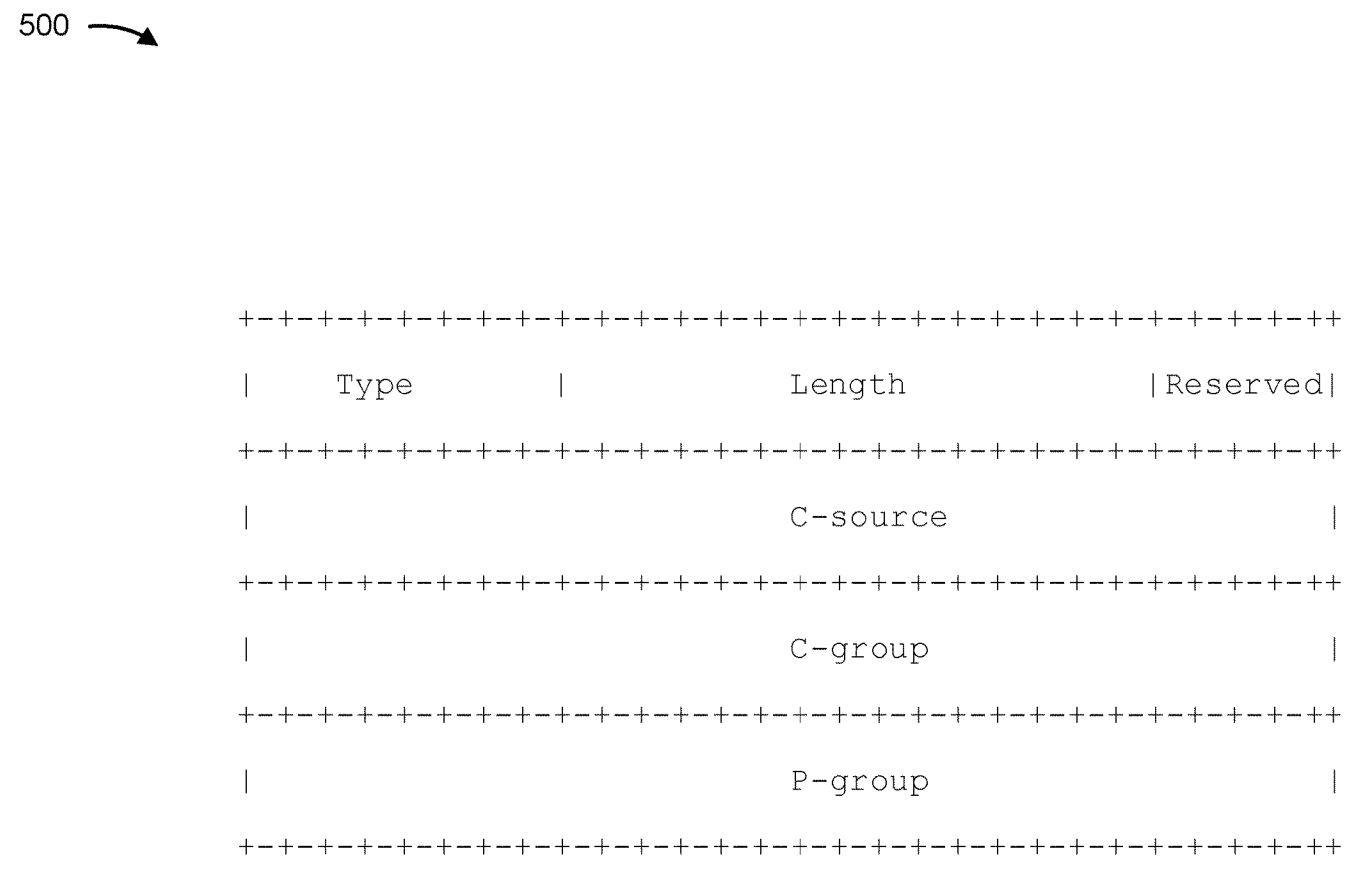

As a more particular example, the probe message may have the packet structure depicted in FIG. 5.

In the diagram depicted in FIG. 5, the Type field may be a 1-byte field with a value (e.g., 2) for probe messages, the Length field may be a 2-byte field with a value (e.g., 16) for probe messages, the C-Source field may be a 4-byte field with a value that identifies root node 220, the C-Group field may be a 4-byte field that identifies a group or VPN associated with root node 220 and leaf nodes 230, and the P-Group field may be a 4-byte field that identifies the multicast traffic flow.

As further shown in FIG. 4, process 400 may include identifying a set of leaf nodes based on respective acknowledgement messages received from the set of leaf nodes based on the probe messages (block 420). For example, root node 220 may identify a set of leaf nodes 230 based on receiving respective acknowledgement messages from the set of leaf nodes 230 based on the probe messages.

In some implementations, root node 220 may receive a set of acknowledgement messages from a set of leaf nodes 230 of the plurality of leaf nodes 230. The acknowledgement messages may indicate that the set of leaf nodes 230 are to receive the traffic flow that is to be multicasted. For example, leaf node 230 may determine that one or more recipient customer devices 210 associated with the leaf node 230 are interested in receiving the traffic flow, and may provide an acknowledgement message based on the one or more recipient customer devices 210 being interested in the traffic flow.

In some implementations, root node 220 may receive the set of acknowledgement messages via unicast on an Internet protocol (IP) layer (e.g., as opposed to a physical layer via the default MDT). In this way, root node 220 conserves resources of other leaf nodes 230 that would otherwise be used to receive and process irrelevant acknowledgement messages. Additionally, or alternatively, root node 220 may receive the acknowledgement messages via the default MDT. In this way, root node 220 may receive the acknowledgement messages more quickly and/or efficiently than an IP layer message.

In some implementations, the acknowledgement message may be defined based on a type-length-value element of a specification, such as RFC 6037. For example, the acknowledgement message may identify a message type (e.g., a byte value of 3 that identifies the message as an acknowledgement message). Additionally, or alternatively, the acknowledgement message may identify a length (e.g., one or more bytes that identify a length of the acknowledgement message as 16 bytes, 32 bytes, or the like). Additionally, or alternatively, the acknowledgement message may identify a join/prune field. A bit value of the join/prune field may indicate whether a leaf node 230 is an interested leaf node 230. For example, a bit value of 1 may identify an interested leaf node 230, and a bit value of 0 may indicate that a leaf node 230 is not interested in receiving a traffic flow. Additionally, or alternatively, a bit value of 0 may indicate that the message is a prune message, as described below with reference to block 435.

In some implementations, the acknowledgement message may identify a customer multicast source network address (e.g., C-source) (e.g., an IPv4 address or IPv6 address). Additionally, or alternatively, the acknowledgement message may identify a customer multicast group network address (e.g., C-group) (e.g., an IPv4 address or IPv6 address). Additionally, or alternatively, the acknowledgement message may identify a multicast group address that root node 220 may use to send data MDT traffic (e.g., P-group).

Figure 6:
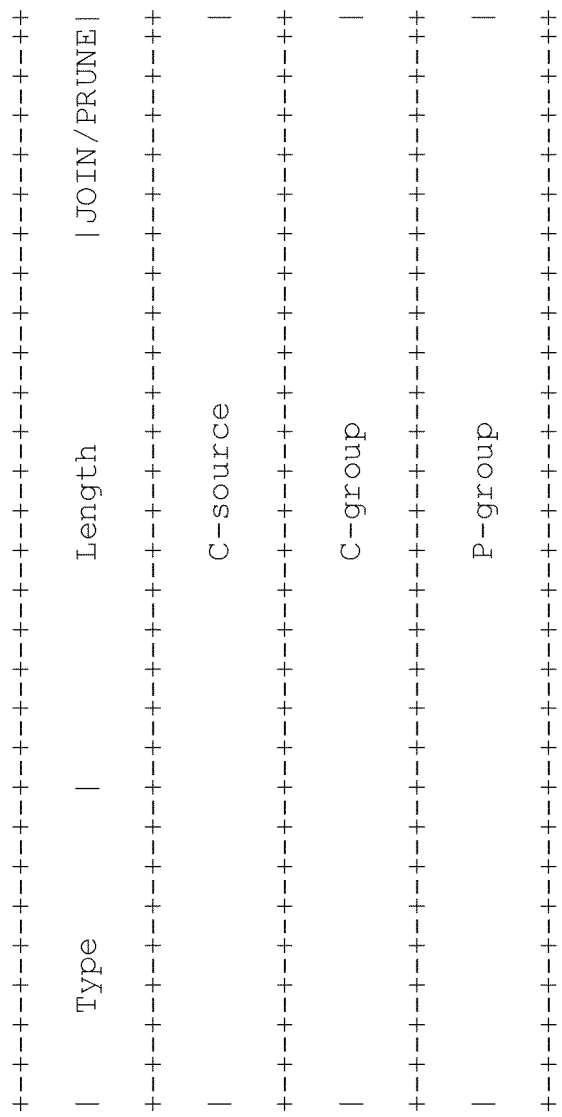
FIG. 6 is a diagram of an example acknowledgement message.

As an example, the acknowledgement message may have the packet structure depicted in FIG. 6.

In the diagram depicted in FIG. 6, the Type field may be a 1-byte field with a value (e.g., 3) for acknowledgement messages, the Length field may be a 2-byte field with a value (e.g., 16) for acknowledgement messages, the JOIN/PRUNE may be a 1-byte field with a value that indicates whether the acknowledgement message is a join message or a prune message, the C-Source field may be a 4-byte field with a value that identifies root node 220, the C-Group field may be a 4-byte field that identifies a group or VPN associated with root node 220 and leaf nodes 230, and the P-Group field may be a 4-byte field that identifies the multicast traffic flow.

In some implementations, root node 220 may store information identifying interested leaf nodes 230 and traffic flows corresponding to the interested leaf nodes 230. For example, root node 220 may store a data structure identifying a multicast source network address and/or multicast group network addresses associated with a particular traffic flow, and may store a network address and/or multicast group addresses of interested leaf nodes 230 that are interested in the particular traffic flow. When root node 220 receives an acknowledgement message from a particular leaf node 230, root node 220 may add the particular leaf node 230 to a data structure identifying interested leaf nodes 230 for a particular traffic flow (e.g., when the acknowledgement message indicates that particular leaf node 230 is interested in the particular traffic flow), or may remove the particular leaf node 230 from the data structure (e.g., when the acknowledgement message is a prune message that identifies the particular traffic flow).

As further shown in FIG. 4, process 400 may include determining whether a quantity of the set of leaf nodes satisfies a quantity threshold (block 425). For example, root node 220 may store or identify a quantity threshold (e.g., as part of a configuration process of root node 220). Root node 220 may determine whether a quantity of the set of leaf nodes 230 satisfies the quantity threshold.

As further shown in FIG. 4, when the quantity of the set of interested leaf nodes satisfies the quantity threshold (block 430—Yes), then process 400 may include providing the traffic flow to the plurality of leaf nodes via the default MDT (block 430). For example, when the quantity of the set of interested leaf nodes 230 satisfies a quantity threshold, root node 220 may multicast the traffic flow via a default MDT to the plurality of leaf nodes 230. In this way, when a sufficiently high quantity of leaf nodes 230 are interested leaf nodes 230, root node 220 may conserve network resources by multicasting the traffic flow via the default MDT, rather than configuring a data MDT to multicast the traffic flow to leaf nodes 230. This, in turn, may conserve resources of root node 220 and/or leaf nodes 230 that would otherwise be used to establish and maintain a data MDT.

As further shown in FIG. 4, process 400 may include receiving zero or more prune messages from zero or more of the set of interested leaf nodes (block 435). For example, root node 220 may receive one or more prune messages from at least one of the set of leaf nodes 230. A prune message may indicate that a leaf node 230 is no longer interested in receiving a traffic flow identified by the prune message. As described above, in some implementations, a prune message may be similar to an acknowledgement message, and may include a bit value indicating that a particular leaf node 230 is no longer interested in receiving the traffic flow.

As further shown in FIG. 4, process 400 may include determining that a remaining quantity of the set of interested leaf nodes does not satisfy the quantity threshold (block 440). For example, after receiving the one or more prune messages, root node 220 may determine that a remaining quantity of interested leaf nodes 230 (i.e., leaf nodes 230 that are still interested in receiving the traffic flow) does not satisfy the quantity threshold. In such a case, it may be advantageous to establish a data MDT with the remaining quantity of leaf nodes 230 to provide the traffic flow. In some implementations, root node 220 may determine that the remaining quantity of interested leaf nodes 230 satisfies the quantity threshold, and may continue providing the traffic flow via the default MDT. However, for the purpose of process 400, assume that the remaining quantity of leaf nodes 230 does not satisfy the quantity threshold.

As further shown in FIG. 4, when the quantity of the set of interested leaf nodes does not satisfy the quantity threshold (block 425—No), or when the remaining quantity of interested leaf nodes does not satisfy the quantity threshold (block 440), then process 400 may include establishing a data MDT with the set of interested leaf nodes (block 445). For example, root node 220 may establish a data MDT with the set of leaf nodes 230 when the quantity of interested leaf nodes 230 does not satisfy the quantity threshold (e.g., based on an initial quantity of interested leaf nodes 230 or based on a remaining quantity after root node 220 after receiving one or more prune messages).

In some implementations, to establish a data MDT with the set of leaf nodes 230, root node 220 may provide join messages to the plurality of leaf nodes 230 (e.g., via the default MDT). A join message may be defined based on a type-length-value element of a specification, such as RFC 6037. For example, the join message may identify a message type (e.g., a byte value, such as a value of 1, that identifies the message as a join message). Additionally, or alternatively, the join message may identify a length of the join message (e.g., 16 bytes, 32 bytes, etc.). In some implementations, the join message may identify a customer multicast source network address (e.g., C-source), a customer multicast group network address (e.g., C-group) (e.g., IPv4 address or IPv6 address), and/or a multicast group address that root node 220 may use to send data MDT traffic (e.g., P-group).

Figure 7:
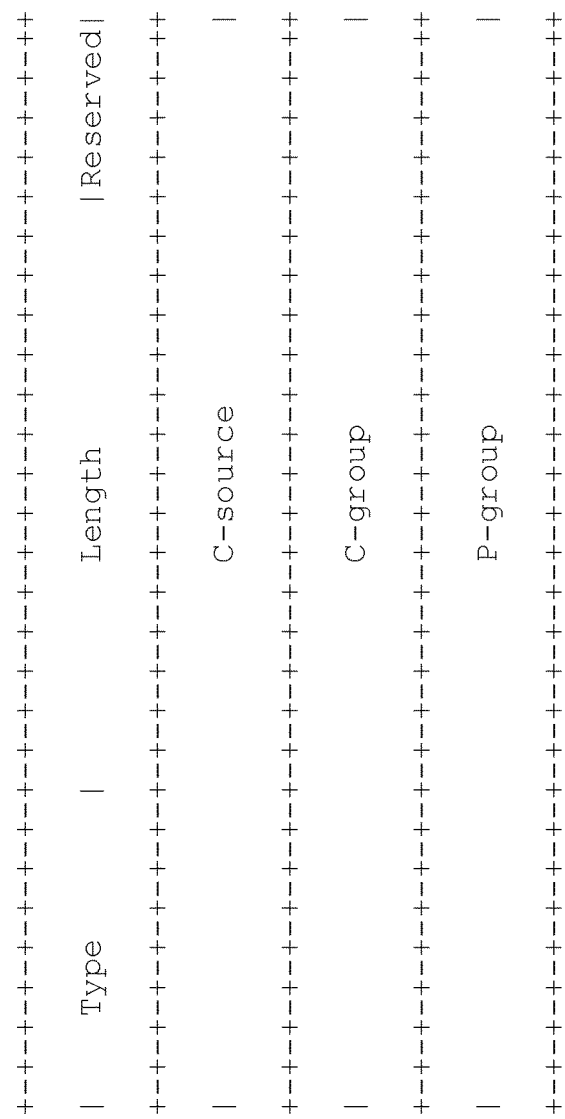
FIG. 7 is a diagram of an example join message.

As a more particular example, the join message may have the packet structure depicted in FIG. 7.

In the diagram depicted in FIG. 7, the Type field may be a 1-byte field with a value (e.g, 1) for join messages, the Length field may be a 2-byte field with a value (e.g., 16) for join messages, the Reserved field may have a size of 1 byte, the C-Source field may be a 4-byte field with a value that identifies root node 220, the C-Group field may be a 4-byte field that identifies a group or VPN associated with root node 220 and leaf nodes 230, and the P-Group field may be a 4-byte field that identifies the multicast traffic flow.

In some implementations, root node 220 may define the acknowledgement message and/or the prune message based on a modification to the join message used to establish a data MDT (e.g., the type-1 message). For example, the join message may include one or more reserved bits, as shown above. The reserved bits may be used to identify join messages, probe messages, and/or acknowledgement messages (e.g., in a case where the join messages, probe messages, and/or acknowledgement messages have the same message type value). For example, root node 220 may broadcast a join message with a first value of the reserved bits to identify the join message as a probe message. The join message, as the probe message, may identify the traffic flow. In some implementations, each leaf node 230 that receives the join message as the probe message may transmit a respective join message with a respective value of the reserved bits defining the respective join message as an acknowledgement message or a prune message. For example, a second value of the reserved bits may identify an acknowledgement message, and a third value of the reserved bits may identify a prune message. The join messages transmitted by leaf nodes 230 may also include information identifying the respective leaf nodes 230 and root node 220 (e.g., a unicast address of root node 220, and respective network addresses of leaf nodes 230).

Based on the information identifying root node 220, root node 220 may process the acknowledgement messages or prune messages. For example, when root node 220 receives a join message that identifies the unicast address of root node 220, root node 220 may determine whether the join message is an acknowledgement message or a prune message, and may process the join message based on the process described above.

In this way, root node 220 allows configuration of root nodes 220 and leaf nodes 230 to transmit the probe messages, acknowledgement messages, and prune messages using existing messaging protocols, which may conserve resources that would otherwise be used to define or use new messaging protocols for the probe messages, acknowledgement messages, and prune messages. Additionally, defining the acknowledgement message and/or the prune message based on a modification to the join message reduces a likelihood of an error or fault from a leaf node 230 that is not configured to handle probe messages, acknowledgement messages, and/or prune messages.

In some implementations, root node 220 may selectively configure a data MDT or a default MDT based on a data rate threshold and/or a quantity threshold. For example, root node 220 may provide the traffic flow via the default MDT when a data rate of the traffic flow satisfies the data rate threshold and/or when the quantity of interested leaf nodes 230 does not satisfy the quantity threshold (e.g., when the traffic flow is a high-bandwidth traffic flow and the quantity of interested leaf nodes 230 is low). Additionally, or alternatively, root node 220 may provide the traffic flow via the data MDT when the data rate of the traffic flow does not satisfy the data rate threshold or when the quantity of interested leaf nodes 230 satisfies the quantity threshold (e.g., when the traffic flow is a high-bandwidth traffic flow or the quantity of interested leaf nodes 230 is high). In this way, in a situation where a data MDT is used, root node 220 conserves network bandwidth resources that would otherwise be used to multicast the network traffic to each leaf node 230. Further, in a situation where a default MDT is used, root node 220 conserves processor and/or storage resources of leaf nodes 230 that would otherwise be used to establish and maintain a resource-costly data MDT.

As further shown in FIG. 4, process 400 may include providing the traffic flow to the set of interested leaf nodes via the data MDT (block 450). For example, root node 220 may provide the traffic flow to the set of interested leaf nodes 230 via the data MDT based on the network addresses and group address identified by the probe message and/or the acknowledgement messages. In this way, network bandwidth is conserved that would otherwise be used to multicast the traffic flow via the default MDT.

In some cases, the quantity of interested leaf nodes 230 may increase to satisfy the quantity threshold, or a data rate may decrease to no longer satisfy a data rate threshold. In such a case, root node 220 may end the data MDT, and may provide the traffic flow via the default MDT. In this way, root node 220 conserves processor and/or storage resources of leaf nodes 230 that would otherwise be used to establish and maintain a resource-costly data MDT.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In implementations described herein, root node 220 tracks a quantity of leaf nodes 230 that are interested in receiving a multicast traffic flow, and selectively provides the multicast traffic flow using a default MDT or a data MDT based on the quantity of interested leaf nodes 230 and/or based on a bandwidth of the multicast traffic flow. In this way, in a situation where a data MDT is used, the root node conserves network bandwidth resources that would otherwise be used to multicast the network traffic to each leaf node of the network. Conversely, in a situation where a default MDT is used, root node 220 conserves processor and/or storage resources of leaf nodes 230 that would otherwise be used to establish and maintain a resource-costly data MDT.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first device, comprising:
one or more memories; and
one or more processors, communicatively coupled to the one or more memories, to:
 receive a traffic flow to be multicasted to at least two of a plurality of second devices;
 provide first messages to the plurality of second devices identifying the traffic flow,
  the first messages being provided to the plurality of second devices using a first type of multicast distribution tree;
 identify a set of interested second devices, of the plurality of second devices, based on respective second messages that are received from the set of interested second devices based on the first messages,
  the respective second messages being received by the first device via unicast on an Internet Protocol (IP) layer;
 determine whether a quantity of the set of interested second devices satisfies a threshold;
 selectively provide the traffic flow to the set of interested second devices, using the first type of multicast distribution tree or a second type of multicast distribution tree, based on whether the quantity satisfies the threshold,
  the traffic flow to be provided to the set of interested second devices, using the first type of multicast distribution tree, when the quantity satisfies the threshold,
  the traffic flow to be provided to the set of interested second devices, using the second type of multicast distribution tree, when the quantity does not satisfy the threshold;
 receive one or more third messages from one or more second devices of the set of interested second devices,
  the one or more third messages indicating that the one or more second devices are not interested in the traffic flow, and
  the one or more third messages, the first messages, and the respective second messages comprising modified join messages,
   wherein the first messages comprise probe messages and are identified by a first value stored in one or more reserve bits of a first type of modified join message,
   wherein the respective second messages comprise acknowledgement messages and are identified by a second value stored in one or more reserve bits of a second type of modified join message, and
   wherein the one or more third messages comprise prune messages and are identified by a third value stored in one or more reserve bits of a third type of modified join message;
 determine that a remaining quantity of the set of interested second devices, without the one or more second devices, does not satisfy the threshold; and
 provide the traffic flow to the set of interested second devices and not to the one or more second devices based on determining that the remaining quantity does not satisfy the threshold.

2. The first device of claim 1, where the one or more processors, when providing the traffic flow to the set of interested second devices using the first type of multicast distribution tree, are to:
 provide the traffic to the plurality of second devices, including the set of interested second devices, via a default multicast distribution tree.

3. The first device of claim 1, where the one or more processors, when providing the traffic flow to the set of interested second devices using the second type of multicast distribution tree, are to:
 establish a data multicast distribution tree with the set of interested second devices; and
 provide the traffic flow, using the data multicast distribution tree, to the set of interested second devices and not to other second devices in the plurality of second devices.

4. The first device of claim 1, where the first device and the plurality of second devices include edge devices of a provider network.

5. The first device of claim 4, where the provider network includes a Multiprotocol Label Switching (MPLS) virtual private network.

6. The first device of claim 1, where data identifying the one or more third messages as comprising a modified join message type is included in one or more type bits that are different from the one or more reserve bits.

7. The first device of claim 1, where the traffic flow is provided using the second type of multicast distribution tree; and
 where the one or more processors are further to:
  determine that the quantity of the set of interested second devices has increased to a value that satisfies the threshold;
  end the second type of multicast distribution tree based on the quantity of the set of interested second devices increasing to the value that satisfies the threshold; and
  provide the traffic flow via the first type of multicast distribution tree after ending the second type of multicast distribution tree.

8. A non-transitory computer-readable medium storing instructions, the instructions comprising:
 one or more instructions that, when executed by one or more processors of a first network node, cause the one or more processors to:
  receive a traffic flow to be multicasted to at least two of a plurality of second network nodes;
  provide probe messages identifying the traffic flow to the plurality of second network nodes,
   the probe messages to be provided using a default multicast distribution tree (MDT);
  identify a set of interested network nodes, of the plurality of second network nodes, based on respective acknowledgement messages that are received from the set of interested network nodes based on the probe messages,
   the respective acknowledgment messages being received by the first network node via unicast on an Internet Protocol (IP) layer;

determine whether a quantity of the set of interested network nodes satisfies a threshold;
selectively provide, to the set of interested network nodes, the traffic flow using the default MDT or a data MDT based on whether the quantity satisfies the threshold,
   the traffic flow to be provided using the default MDT when the quantity satisfies the threshold, and
   the traffic flow to be provided using the data MDT when the quantity does not satisfy the threshold;
receive one or more prune messages from one or more second network nodes of the set of interested network nodes,
   the one or more prune messages indicating that the one or more second network nodes are not interested in the traffic flow, and
   the one or more prune messages, the probe messages, and the respective acknowledgement messages comprising modified join messages,
      wherein the probe messages are identified by a first value stored in one or more reserve bits of a first type of modified join message,
      wherein the one or more prune messages are identified by a second value stored in one or more reserve bits of a second type of modified join message, and
      wherein the respective acknowledgement messages are identified by a third value stored in one or more reserve bits of a third type of modified join message;
determine that a remaining quantity of the set of interested network nodes,
without the one or more second network nodes, does not satisfy the threshold; and
establish the data MDT with the set of interested network nodes based on determining that the remaining quantity no longer satisfies the threshold.

9. The non-transitory computer-readable medium of claim 8, where the one or more prune messages are provided via an Internet Protocol layer.

10. The non-transitory computer-readable medium of claim 8, where the traffic flow is provided using the data MDT; and
where the one or more instructions, when executed by the one or more processors, further cause the one or more processors to:
   determine that the quantity of the set of interested network nodes has increased to a value that satisfies the threshold;
   end the data MDT based on the quantity of the set of interested network nodes increasing to the value that satisfies the threshold; and
   provide the traffic flow via the default MDT after ending the data MDT.

11. The non-transitory computer-readable medium of claim 10, where the threshold is a quantity threshold; and
where the traffic flow is associated with a data rate; and
where the one or more instructions, that cause the one or more processors to selectively provide the traffic flow using the default MDT or the data MDT, cause the one or more processors to:
   selectively provide the traffic flow using the default MDT or the data MDT based on whether the quantity satisfies the quantity threshold and based on whether the data rate satisfies a data rate threshold,
      the traffic flow to be provided using the data MDT when the data rate satisfies the data rate threshold and the quantity does not satisfy the quantity threshold, and
      the traffic flow to be provided via the default MDT when the data rate does not satisfy the data rate threshold or the quantity satisfies the quantity threshold.

12. The non-transitory computer-readable medium of claim 8, where the first network node includes an ingress edge node of a provider network; and
where the plurality of second network nodes include egress edge nodes of the provider network.

13. The non-transitory computer-readable medium of claim 12, where the provider network includes a Multiprotocol Label Switching (MPLS) virtual private network.

14. The non-transitory computer-readable medium of claim 8, where data identifying the one or more prune messages as comprising a modified join message type is included in one or more type bits that are different from the one or more reserve bits.

15. A method, comprising:
receiving, by a first network node, a traffic flow to be multicasted to at least two of a plurality of second network nodes;
providing, by the first network node, probe messages identifying the traffic flow to the plurality of second network nodes,
   the probe messages provided using a first type of multicast distribution tree;
identifying, by the first network node, a set of interested network nodes, of the plurality of second network nodes, based on respective acknowledgement messages that are received from the set of interested network nodes based on the probe messages,
   the respective acknowledgment messages being received by the first network node via unicast on an Internet Protocol (IP) layer;
determining, by the first network node, whether a quantity of the set of interested network nodes satisfies a threshold;
selectively providing, by the first network node, the traffic flow, using the first type of multicast distribution tree or a second type of multicast distribution tree, based on whether the quantity satisfies the threshold,
   the first network node to provide the traffic flow to the plurality of second network nodes, including the set of interested network nodes, using the first type of multicast distribution tree when the quantity satisfies the threshold, and
   the first network node to provide the traffic flow to the set of interested network nodes using the second type of multicast distribution tree when the quantity does not satisfy the threshold;
receiving, by the first network node, one or more prune messages from one or more second network nodes of the set of interested network nodes,
   the one or more prune messages indicating that the one or more second network nodes are not interested in the traffic flow, and
   the one or more prune messages, the probe messages, and the respective acknowledgement messages comprising modified join messages,
      wherein the probe messages are identified by a first value stored in one or more reserve bits of a first type of modified join message, wherein the one or more prune messages are identified by a second value stored in one or more reserve bits of a second type of modified join message, and wherein the respective acknowledgement messages are identified by a third value stored in one or more reserve bits of a third type of modified join message;

determining, by the first network node, that a remaining quantity of the set of interested network nodes, without the one or more second network nodes, does not satisfy the threshold; and providing, by the first network node, the traffic flow to the set of interested network nodes and not to the one or more second network nodes based on determining that the remaining quantity does not satisfy the threshold.

16. The method of claim 15, further comprising:

establishing the second type of multicast distribution tree with the set of interested network nodes based on providing a join message to the set of interested network nodes, the join message identifying the traffic flow, and the set of interested network nodes being configured based on the join message to receive the traffic flow via the second type of multicast distribution tree.

17. The method of claim 15, where the threshold is a first threshold; and where the traffic flow is associated with a data rate; and where the method further comprises:

determining whether the data rate satisfies a second threshold; and where selectively providing the traffic flow using the first type of multicast distribution tree or the second type of multicast distribution tree comprises:

selectively providing the traffic flow using the first type of multicast distribution tree or using the second type of multicast distribution tree based on whether the quantity satisfies the first threshold and/or the data rate satisfies the second threshold, the traffic flow to be provided using the second type of multicast distribution tree when the quantity does not satisfy the first threshold and the data rate satisfies the second threshold, and the traffic flow to be provided using the first type of multicast distribution tree when the quantity satisfies the first threshold or the data rate does not satisfy the second threshold.

18. The method of claim 15, further comprising:

determining that the quantity of the set of interested network nodes has increased to a value that satisfies the threshold;

ending the second type of multicast distribution tree based on determining that the quantity of the set of interested network nodes has increased to the value that satisfies the threshold; and providing the traffic flow using the first type of multicast distribution tree after ending the second type of multicast distribution tree.

19. The method of claim 15, where data identifying the one or more prune messages as comprising a modified join message type is included in one or more type bits that are different from the one or more reserve bits.

20. The method of claim 15, where the first network node and the plurality of second network nodes include edge devices of a provider network.

* * * * *